Sept. 15, 1959 R. H. BEGEMAN 2,904,684

FREQUENCY-STABILIZED PULSE GENERATOR

Filed Nov. 29, 1956 2 Sheets-Sheet 1

INVENTOR.
ROBERT H. BEGEMAN

BY [signature]
ATTORNEYS

INVENTOR.
ROBERT H. BEGEMAN
BY
H. W. Losche
ATTORNEYS

United States Patent Office 2,904,684

Patented Sept. 15, 1959

2,904,684

FREQUENCY-STABILIZED PULSE GENERATOR

Robert H. Begeman, Indianapolis, Ind., assignor to the United States of America as represented by the Secretary of the Navy Application November 29, 1956, Serial No. 625,201

4 Claims. (Cl. 250—27)

Figure 1:
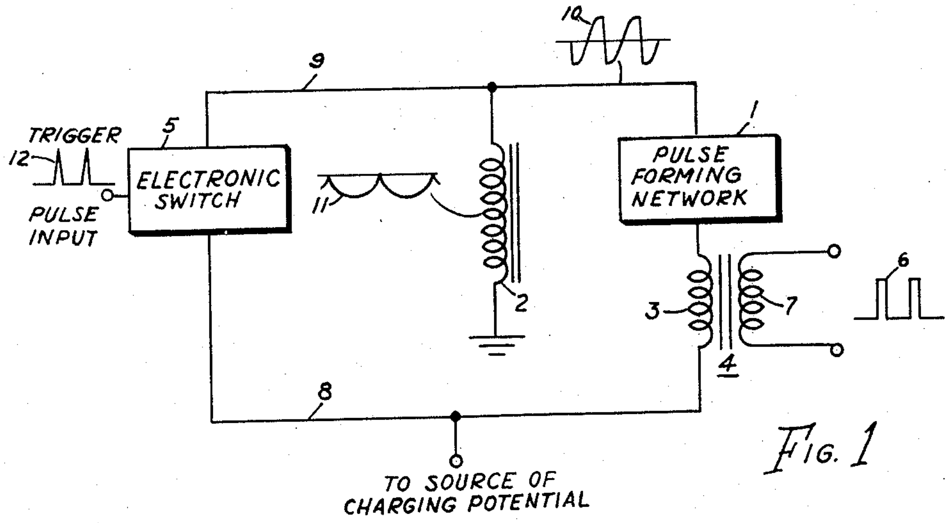

(Granted under Title 35, U.S. Code (1952), sec. 266)

The invention described herein may be manufactured and used by or for the Government of the United States of America for governmental purposes without the payment of any royalties thereon or therefor.

The subject invention pertains to pulse generators of the type utilizing a storage element for electrical energy which is charged during interpulse intervals from a source of charging potential, a switch for abruptly discharging the stored electrical energy into an output circuit to generate output pulses, and a driver oscillator for producing driver pulses to actuate the switch at the end of each interpulse interval. Pulse generators of the kind described are applicable especially for generating the high-power pulses required to pulse the magnetron of radar transmitter into periodic operation.

In accordance with the invention, a pulse generator having a stabilized pulse repetition frequency may comprise a source of electrical energy; storage means such as an artificial transmission line effectively coupled in series with a nondissipative charging element across the source for storing a predetermined amount of electrical energy; releasing means such as an electronic switch coupled effectively to the storage means to release the stored electrical energy in pulse form; triggering means such as a blocking oscillator driver for generating driver pulses to actuate the electronic switch periodically; and a feedback channel for combining a voltage representative of the current-wave in the nondissipative charging element with the recycling pulse of the blocking oscillator in such a way that the repetition frequency of the pulse generator is stabilized.

Fundamentally, a pulse generator in accordance with this invention may effect a stabilized pulse repetition rate by transforming the waveform of the recycling pulse present at the controlling element of the blocking oscillator from one having a broad, rounded peak to one having a sharply pointed peak. This modification of waveform is produced by adding to the recycling signal a voltage representative of the current-wave in the non-dissipative charging element.

The blocking oscillator may be self-triggering, or it may be of the type which normally is driven into each conductive swing by a driving pulse applied to the control grid from an external source, or it may be of the free-running type synchronized by pulses supplied from an external source. Thus, where the blocking oscillator is self-triggering, the peaks of the feedback voltage from the nondissipative element may be characterized as "timing" pulses because each is operative merely to insure that each successive conductive swing of the oscillator occurs at the end of equal interpulse time intervals. On the other hand, where the blocking oscillator is biased to be driven into each conductive swing by a pulse from an external source, the peaks of the feedback voltage from the nondissipative element may be characterized as "driving" pulses because each must combine with the existing potential on the controlling element of the oscillator before its bias rises above the plate current cutoff level and a new conductive swing occurs. It should be understood that the repetition frequency of the blocking oscillator may exceed that of the peaks of the feedback voltage portion in some applications. When such is the case, the peaks of the feedback voltage function as synchronizing pulses for the oscillator. Furthermore, a slight reduction in repetition frequency stability may result.

In pulse radar transmitters, short "bursts" or pulses of microwave energy must be supplied to the antenna at precisely-timed intervals. The microwave pulses frequently must have a power magnitude in the megawatt range and a duration on the order of a microsecond or fraction thereof. Such pulses may be produced, for example, by modulating the plate of a magnetron with a high-power pulse having a repetition frequency equal to that of the pulses to be transmitted. Hereinafter the modulating pulse generator will be called a pulser.

A conventional pulser for generating high-power modulating pulses may comprise an electrical storage element which receives electrical energy from a charging source and stores it in the form of an electrostatic field during all or a substantial portion of the interval between successive modulating pulses, and an electronic switch coupled in parallel therewith across the energy source. When the electronic switch is closed, the discharge of the storage element into an output circuit produces the high-power modulating pulses.

A suitable electronic switch may comprise a hydrogen-filled thyratron which is closed at the end of each interpulse interval by a pulse of ionizing potential generated in a driver oscillator and applied to the thyratron firing grid. It should be apparent, therefore, that precise timing of the modulating output pulses will depend upon the frequency stability of the driver pulses. These pulses also must have proper amplitude, shape, and duration. For example, a satisfactory driver pulse for the electronic switch may be in the form of a sharp spike having a very short time duration on the order of one or a fraction microseconds and a moderate amplitude in the range of 30–200 volts. In apparatus embodying the subject invention, the driver oscillator for generating pulses to fulfill the aforesaid requirements may be a conventional blocking oscillator.

Ordinarily, the inherent frequency drift of self-triggered blocking oscillators renders them unsuitable for applications where pulse-frequency stability is important. Undesirable frequency drift may be attributed to minute fluctuations in bias potentials, changes in the values of circuit constants as the result of temperature variations and other causes. A conventional self-triggered blocking oscillator is sensitive to these influences because the recycling pulses developed in its control grid circuit to initiate successive conductive swings of the oscillator are nonlinear sawtooths having broad, rounded peaks. The manner in which the rounded peaks of the recycling pulses combine with the aforesaid changes in circuit parameters to produce repetition frequency instability will be explained hereinafter.

Heretofore, precise control of the repetition frequency of blocking oscillators has required that each conductive swing be timed by a pulse of proper shape applied to the plate or control grid, or that the quiescent biasing potentials of the oscillator tube be maintained at plate current cutoff levels such that each swing will be triggered by a driving pulse applied to the control grid or the cathode. In addition, it has been found possible to obtain sufficient repetition frequency stability for some applications by providing regulated heater and plate-voltage supplies. Inasmuch as the use of these methods of frequency stabilization entails either the provision of an additional pulse generator to supply timing or driving pulses, such as the case may be, or the provision of voltage-regulator circuitry, the expense incident to the design, development, and production of radar transmitters is increased. Furthermore, the weight of such apparatus is made commensurately greater, and its circuitry is rendered immeasurably more complex and less reliable. The desirability of minimizing the weight factor in the design of airborne equipment should be obvious.

Accordingly, the principal objects of the invention are to provide:

(1) A pulse generator.

(2) A pulse generator for producing output pulses having a stable repetition frequency.

(3) A pulse generator wherein a feedback signal is utilized to stabilize the pulse repetition frequency of the generator.

(4) A pulse generator wherein the operation of an oscillator drive for a pulser is controlled in frequency by signal peaks fed back to the oscillator from the charging circuit of the pulser.

(5) A pulse generator wherein a pulser comprising a charging circuit having a nondissipative element is discharged through an electronic switch actuated by the output pulse of an oscillator driver, and each successive pulse from the driver occurs at the end of equal time intervals as the result of a controlling signal developed through the action of the nondissipative element and fed back to control the operation of the oscillator.

(6) A pulse generator comprising a charge storage element for storing electrical energy, a direct current charging circuit including a nondissipative element, a switch for abruptly discharging the stored electrical energy into an output circuit to produce a pulse, a driver oscillator for producing driver pulses to actuate the switch, and a feedback channel to provide a controlling signal derived through the action of the nondissipative element to the driver oscillator tube at the end of equal time intervals, such that the pulse repetition frequency of the generator is stabilized.

(7) A pulse generator having maximum reliability, minimum weight, and fewer components.

(8) Means of superior economy and engineering simplicity for effectuating the aforesaid objects.

Figure 2:
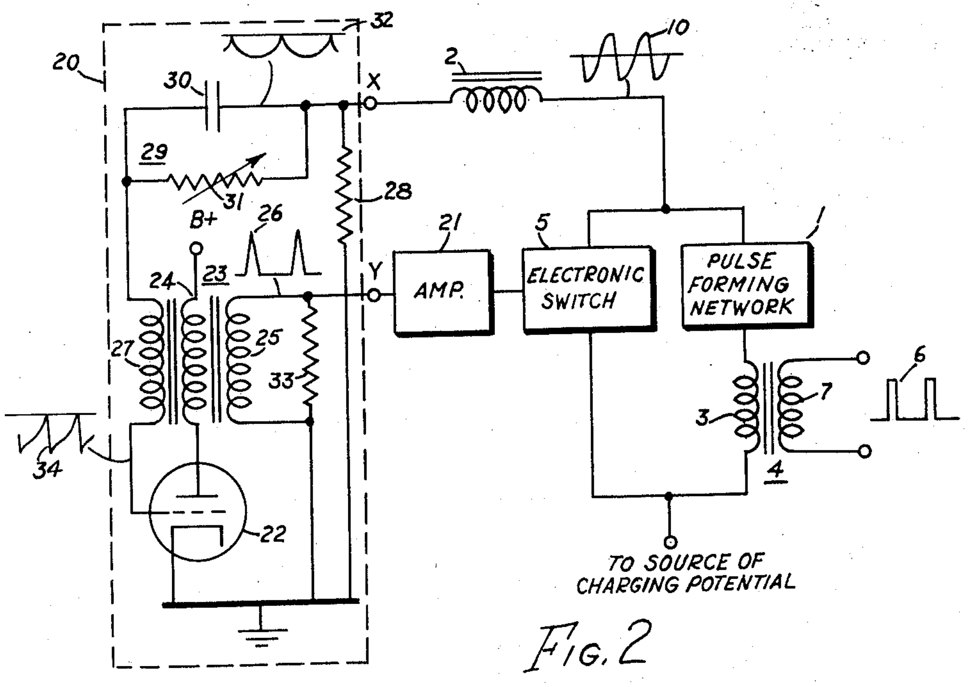
Figure 3:
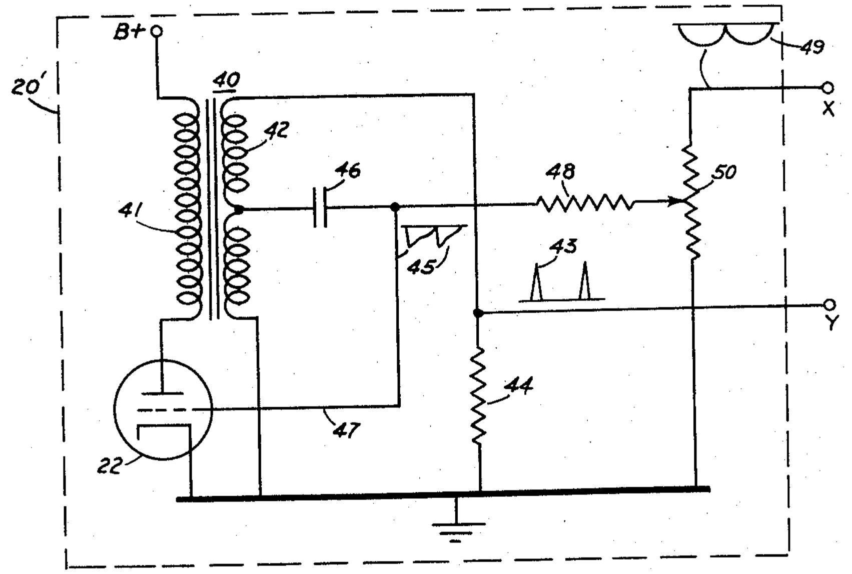
Figure 4:
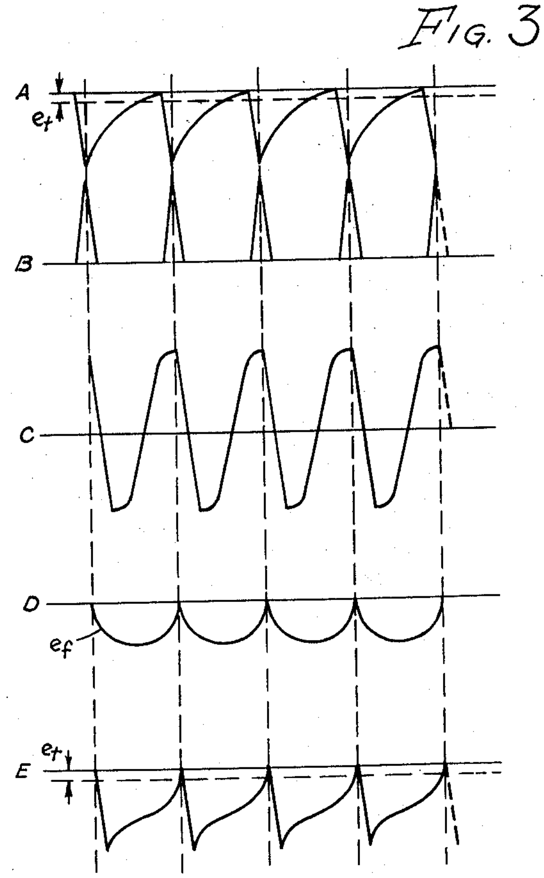

The foregoing summary of the invention, statement of the problem evoking its origination, and enumeration of its objects are intended merely to facilitate an understanding and appreciation of its principal features, not to restrict its scope. It is probable that additional objects and features of the invention will become apparent after reference to the following detailed description made in conjunction with the accompanying drawings wherein:

Fig. 1 is a partial schematic diagram representing the charging and discharging circuitry of a pulser to which the invention is especially applicable, Fig. 2 represents a partial schematic diagram of a specific embodiment of the invention, Fig. 3 represents a modified version of the blocking oscillator driver circuitry enclosed within the dotted lines of Fig. 2, and Fig. 4 represents typical waveforms present at various locations within the circuits of Figs. 1, 2, and 3.

The charge-discharge circuitry, Fig. 1, of a pulser constructed in accordance with the invention may comprise a pulse-forming network 1 coupled across a source of charging potential in series with a nondissipative inductive charging element 2, and the primary 3 of pulse output transformer 4. An electronic switch 5 provided with an input terminal for driver pulses is coupled in parallel with pulse-forming network 1 and the output transformer 4. The output pulses 6 appear across the terminals of the secondary winding 7 of the output transformer 4.

The pulse-forming network 1 may comprise an artificial transmission line network, a condenser, or any other component in which electrical energy may be stored and discharged in very short time intervals. The electronic switch 5 may comprise a thyratron, a fixed trigger gap, or any other device through which a conductive path is established during an electrical impulse and is disrupted at, before, or shortly after its cessation. The source of charging potential may be any device or apparatus which will supply a direct-current potential of suitable magnitude. The nondissipative inductive charging element 2 may comprise any inductor having suitable current rise and decay characteristics.

To aid in explaining the operation of the charge-discharge circuit of Fig. 1, it is assumed that the pulse-forming network 1 has been fully charged with electrical energy from the source of charging potential. A driver pulse 12 applied to the input terminal of electronic switch 5 will establish a discharge path through the primary winding 3 of the output transformer 4, conductor 8, electronic switch 5, and conductor 9. Upon completion of the energy discharge, electronic switch 5 opens immediately, thereby disrupting the discharge path and initiating the recharge cycle for pulse-forming network 1. The rapid discharge of stored electrical energy from the pulse-forming network 1 produces the high-power output pulses 6 at the terminals of the secondary winding 7 of output transformer 4.

If it is assumed also that the source of charging potential provides a unidirectional potential of negative polarity, the shape of the voltage-wave appearing on conductor 9 will be substantially as represented by waveform 10. At the instant immediately preceding the application of negative charging potential, the voltage on conductor 9 is at ground potential. During the very brief interval that electronic switch 5 is closed the potential of conductor 9 decreases almost abruptly to a level which approximates the magnitude of the negative potential. Immediately thereafter the electronic switch opens again. As more and more energy is absorbed by the pulse-forming network 1, the voltage on conductor 9 begins to decay. The current through the inductor 2 then rises to the maximum value represented in waveform 11. When maximum current occurs in charging inductor 2, the voltage on conductor 9 once more is at ground potential. Further decay of the current of charging inductor 2 produces a positive voltage on conductor 9 which rises to a magnitude approximating, in the direction of positive polarity, the magnitude of the negative source of charging potential. When the current in charging inductor 2 is zero, pulse-forming network 1 is charged to its maximum potential. At this instant, the second trigger pulse of the input waveform 12 is applied to the electronic switch 5, again discharging the pulse-forming network and initiating a new charging cycle.

It should be noticed that the charge-discharge circuit of Fig. 1 is one in which series charging occurs. The pulse-forming network 1 is charged through the charging inductor 2 and the primary 3 of output transformer 4. Alternatively, a circuit utilizing parallel charging may be used. In a parallel charging circuit, a source of charging potential would be connected continuously to the pulse-forming network through the charging inductor. Inasmuch as no way is known for preventing the grounding of the electronic switch, output transformer, and pulse-forming network of a parallel charging circuit, the series charging circuit as represented in Fig. 1 is preferred.

A frequency-stabilized pulser embodying the subject invention is represented in Fig. 2. Generally, such a pulser comprises the charge-discharge circuitry of Fig. 1 and a driver oscillator 20 represented within the dotted lines. For simplicity, similar components in each of the figures have been provided with the same reference numerals. The operation of the charge-discharge circuit of Fig. 2 is the same as that of Fig. 1.

The driver oscillator 20 is a conventional blocking oscillator comprised of oscillator tube 22 and dual secondary output transformer 23 having its primary winding 24 coupled in series between the plate of oscillator tube 22 and a source of B+ potential, a first secondary winding 25 from which output trigger pulses 26 are derived, and a second secondary winding 27 from which regenerative feedback pulses are derived. Output voltage pulses 26 are developed across load resistor 33.

A principal feature of the invention is a feedback channel to the control grid of oscillator tube 22 comprising a resistor 28 coupled between the charging inductor 2 and a ground source of unidirectional potential, an R-C network 29, and secondary winding 27 of the pulse transformer. The R-C network 29, comprised of condenser 30 connected in parallel with variable resistor 31, is coupled in series with secondary winding 27 of transformer 23 between the upper terminal of resistor 28 and the control grid of oscillator tube 22.

The operation of the pulse generator represented in Fig. 2 will be explained with reference to the curves of Fig. 4. The driver oscillator 20 functions as a conventional, self-triggered, blocking oscillator. Assume that plate current conduction initially occurs in oscillator tube 22 when the oscillator is energized. As a result of the regenerative feedback from secondary winding 27 of output transformer 23 to the control grid of oscillator tube 22, the plate current rises abruptly to its maximum as represented in waveform 26 and curve B of Fig. 4. As the plate current begins to rise, the direct-current potential at the plate of tube 22 becomes more negative with respect to the B+ potential present at the upper end of the primary winding 24. As a result, the lower end of secondary winding 27 renders the control grid of tube 22 positive with respect to the cathode, and electrons are collected by the control grid. These electrons pass through secondary winding 27 and accumulate rapidly on the left-hand plate of condenser 30. The positive potential on the control grid also increases the rate of plate current build-up and, in a very short time after the plate current begins flowing, enough electrons having accumulated on the left-hand plate of grid capacitor 30 to prevent any further swing of the control grid potential in the positive direction. At this time the rate of plate current build-up in the primary winding 24 begins to decrease until the point is reached where induced voltage no longer exists across secondary winding 27. Accordingly, the negative charge on the left-hand plate of grid capacitor 30 ceases to increase and the discharge of the capacitor 30 to ground through variable resistor 31 and resistor 28 begins to predominate, thereby initiating a recycling pulse and causing the positive potential on the control grid of tube 22 to decrease cumulatively. As a result, the plate current abruptly falls to zero. The pulses resulting from the rapid rise and decay of current in primary winding 24 of output transformer 23 are represented in waveform 26 and again in curve B of Fig. 4. It should be understood, of course, that a fixed resistor may be used in lieu of variable resistor 31. In the embodiment of Fig. 2 and in many applications it may be desirable to use a variable resistor in order to provide a convenient control for adjusting the repetition frequency of driver oscillator 20.

If it is assumed that the driver oscillator 20 is disconnected electrically from the charge-discharge circuit at terminals, X, Y, the voltage waveform for recycling pulses developed on the control grid of oscillator tube 22 is represented in curve A of Fig. 4. From examination of the waveform it is apparent that an abrupt rise of plate current causes the negative charge on the grid capacitor 30 to build up very rapidly until maximum plate current occurs. A comparison of curves A and B indicates that the maximum charge on the grid capacitor 30 occurs substantially simultaneously with maximum plate current. Immediately thereafter the grid capacitor 30 begins to discharge exponentially through the grid resistor 31 and resistor 28, causing the plate current to decrease abruptly to zero, thereby forming the sharp switch driver pulses 26 of Fig. 2 and curve B of Fig. 4. The grid capacitor 30 continues to discharge exponentially for a time determined by the R-C time constant of network 29 in combination with resistor 28. As more and more of the negative charge leaks from the left-hand plate of grid capacitor 30 to ground, the control grid of tube 22 becomes less negative until the required self-triggering potential is reached, plate current begins to flow, and a new conductive swing is initiated. For convenience the control grid potential at which a new conductive swing is triggered may be called $e_t$. As indicated in curve A of Fig. 4, $e_t$ normally occurs on a portion of the decay characteristic of grid capacitor 30 where its slope approaches zero. As a result, very minute changes in potential caused by variations in the circuit parameters of driver oscillator 20 may produce intolerable fluctuations in the length of the interpulse intervals between successive driver pulses 26.

One of the principal objectives of this invention is to eliminate instability of the pulse repetition frequency attributable to the low slope of the voltage waveform of the recycling pulses at the potential level $e_t$ where the driver oscillator is triggered into conduction. Such frequency instability is eliminated effectively by adding a voltage representative of the rise and decay of current through the charging inductor 2 to the recycling pulses on the control grid of oscillator tube 22. As set forth in explaining the operation of the charge-discharge circuit of Fig. 1, the rise of current in inductor 2 begins when electronic switch 5 is closed; current decay ends at a time coinciding with the time when peak charge has been stored in pulse-forming network 1. Inasmuch as the electronic switch 5 is closed again when the peak charge occurs in pulse-forming network 1, current begins to rise again in inductor 2 as soon as it has fallen to zero. These current changes in inductor 2 produces corresponding voltage changes in resistor 28. The shape of these voltage changes is represented in curve 32 and curve D of Fig. 4. It should be noticed that the times of minimum voltage-current coincide substantially with the times of occurrence of the broad rounded peaks of the nonlinear sawtooth of curve A. Accordingly, the effect of adding the feedback pulses of curve D to the potential of curve A existing at the control grid of the oscillator tube 22 is to produce a recycling pulse on the grid having sharply pointed peaks such as the one represented in curve E of Fig. 4. Because the potential $e_t$, at which each conductive swing of the blocking oscillator is initiated, now occurs on the peaked portion of the waveform of curve E, where the slope is very steep, it is apparent that comparatively large fluctuations in the parameters of the oscillator circuit must occur before any appreciable variation is produced in the length of interpulse time intervals separating the output pulses 26 of the driver oscillator. The effect, therefore, of adding curve D to curve A is to stabilize the repetition frequency of the driver oscillator 20 and, hence, the repetition frequency of the pulser represented in Fig. 2.

The curves in Fig. 4 are arranged to disclose the time relationships between the driver pulses represented in curve B, the normally-present, recycling pulses of the blocking oscillator represented in curve A, the charge-discharge cycle for the pulse-forming network 1 represented in curve C, the current rise-decay feedback voltage of the charging inductor 2 represented in curve D, and the recycling pulses of the blocking oscillator, after modification in accordance with the invention, represented in curve E. The current rise and decay times of the charging inductor 2 and, hence, the charging time of the pulse-forming network 1 is established primarily by the inductance of the charging inductor 2 and the capacitive elements of pulse-forming network 1. The driver oscillator 20 for the charge-discharge circuitry of Fig. 2 is designed to trigger at the point of maximum charge of the pulse-forming network 1. As indicated in curves C and D, the time of maximum charge coincides with the time of minimum current in the charging inductor 2; that is, coincidence of the times occurs at the point where the inductor current has decayed to zero and is ready to rise again.

The amplifier 21 of Fig. 2 is inserted primarily for purposes of isolation and impedance matching. In the embodiment represented in Fig. 2, for example, the amplifier 21 may comprise a cathode follower.

It should be understood that a driven blocking oscillator may be utilized in lieu of the free-running oscillator 20 represented in Fig. 2. When such is the case the feedback voltage pulses 32 developed across the resistor 28, if necessary, may be coupled through an amplifier to the grid of oscillator tube 22. The feedback pulses 32 will produce the positive voltage peaks required at the control grid for initiating successive conductive swings of the oscillator. Alternatively the feedback voltage 32 may be coupled to the cathode or plate of oscillator tube 22 provided that suitable amplification and inversion, as may be needed, is included in the feedback channel. It should be apparent that the feedback pulses also may be utilized to synchronize a free-running blocking oscillator having a repetition frequency other than the frequency of the feedback signal 26.

In lieu of the free-running blocking oscillator 20 of Fig. 2, one such as represented in Fig. 3 may be utilized satisfactorily. The oscillator 20′ of Fig. 3 comprises oscillator tube 22, output transformer 40 having a primary winding 41 and a center-tapped secondary winding 42, and an oscillator feedback circuit including grid capacitor 46. The primary winding 41 is coupled between the plate of tube 22 and a source of B+ potential. The oscillator feedback circuit is coupled between the upper terminal of the transformer secondary winding 42 and the control grid of tube 22. The output pulses of the blocking oscillator pass from the upper terminal of the secondary winding 42 through load resistor 44 coupled between the upper terminal of secondary winding 42 and a ground source of constant potential. The resulting voltage output pulses 43 then pass through terminal Y to amplifier 21 of Fig. 2. The regenerative feedback pulses 45 pass to the control grid of oscillator tube 22 through grid capacitor 46 and conductor 47. The negative charge received by grid capacitor 46 during a conductive swing of the oscillator leaks off slowly to a ground source of constant potential through grid leak resistor 48 and a portion of the resistive element of potentiometer 50. In a manner similar to that provided in Fig. 2, the feedback voltage pulses 49 from the charging inductor 2 are applied to the control grid of the oscillator tube 22 through terminal X, potentiometer 50, and grid leak resistor 48. As in the pulser of Fig. 2, the peaks of the feedback voltage 49 coincide with the desired time for initiating each successive conductive swing of the blocking oscillator.

The operation of the blocking oscillator of Fig. 3 is substantially the same as that set forth for the oscillator of Fig. 2. The degree of frequency stabilization, however, resulting from utilization of the oscillator circuit of Fig. 3 may be somewhat less, inasmuch as the feedback channel is connected in such a manner that the grid capacitor 46 integrates the feedback voltage 49. As a result of integration, the sharp peaks of feedback waveform 49 effectively are broadened and rounded, thereby producing regenerative pulses 45 having slopes somewhat less than those of the modified regenerative pulses 34 produced in the oscillator of Fig. 2 at the potential $e_t$ where each successive conductive swing is initiated. It is to be expected, however, that a blocking oscillator constructed in a manner similar to the one represented in Fig. 3 nevertheless will be suitable for many applications where reduced degrees of repetition frequency stability are acceptable. The manner in which the voltage feedback pulses 49 are utilized as control signals for stabilizing the repetition frequency of the driver oscillator is subject to the several obvious alternatives mentioned in connection with the description of Fig. 2.

Although the subject invention has been described with frequent reference to its applicability as a pulser for radar transmitters, it should be understood that the pulse generators in which it is embodied may be utilized for many other purposes. Furthermore, the general principle of stabilizing the frequency of a driver-pulse generator for a charge-discharge circuit, wherein resonant charging with a non-dissipative element is utilized, by developing a feedback voltage representative of the rise and decay of current through the nondissipative element and applying it as a control signal for controlling the time of occurrence of each successive driver pulse, may be applied to pulse generators other than blocking oscillators. This principle, for example, also may be used for synchronizing pulse generators of the multivibrator type.

The representations in the accompanying drawings and set forth in the foregoing description are intended merely to facilitate the practice of the invention by persons skilled in the art. The scope of the invention is delineated in the following claims.

I claim:

1. A direct current frequency-stabilized pulse generator comprising: direct current electrical energy terminals for receiving direct current energy; a pulse-forming network for storing electrical energy; an output circuit for high-power output pulses; a nondissipative charging element for resonantly charging the said network in a charging cycle of fixed time duration beginning substantially at the end and ending substantially at the beginning of each of the said output pulses such that the current through the said charging element has a minimum amplitude at the beginning and end of each of the said charging cycles; means coupling the said network, output circuit, and charging element in series-conductive relation across the said direct current energy terminals; an electronic switch operable in response to driver pulses coupled in parallel-conductive relation with the said network and the said output circuit to release the said stored energy into the said output circuit in the form of high-power pulses; a driver-pulse generator coupled to the said electronic switch for generating driver pulses of normally unstable repetition frequency in response to periodic voltage fluctuations, the said generator having a control element for receiving the said voltage fluctuations, and a direct current feedback channel coupled between the said charging element and the control element of the said driver-pulse generator, the said feedback channel including means for developing a voltage waveform representative of the flow of charging current through the said charging element and an adjustable means for adjusting the repetition frequency whereby the said voltage waveform has spike-shaped peaks substantially coinciding in time with the end of the said charging cycles such that the said driver-pulse generator is rendered operative in response to the aforesaid voltage peaks and, as a result, the pulse repetition frequency of the generator, and hence, the pulser, is stabilized for adjustments of the adjustable means.

2. A direct current frequency-stabilized pulser as set forth in claim 1 wherein said adjustable means is a variable resistor in parallel with capacitive means for adjusting the time constant of said voltage waveform applied to said control element of said driver-pulse generator.

3. A direct current frequency-stabilized pulser as set forth in claim 1 wherein said adjustable means is a potentiometer having a resistive element connected between said charging element and a ground source of constant potential, and a slidable tap coupled to said control element of said driver-pulse generator.

4. A direct current frequency-stabilized pulser as set forth in claim 1 wherein said driver-pulse generator is a blocking oscillator including a triode for receiving said voltage fluctuations on the grid thereof for producing said driver pulses in response to said periodic voltage fluctuations.

References Cited in the file of this patent

UNITED STATES PATENTS

| | | |
|---|---|---|
| 2,439,286 | Crosby | Apr. 6, 1948 |
| 2,469,977 | Morrison | May 10, 1949 |
| 2,625,652 | Krulikoski et al. | Jan. 13, 1953 |
| 2,674,691 | Krulikoski et al. | Apr. 6, 1954 |